US009038690B1

(12) United States Patent
Hsiao et al.

(10) Patent No.: US 9,038,690 B1
(45) Date of Patent: May 26, 2015

(54) UNIVERSAL HEAT PRESS MACHINE

(71) Applicants: Eddie Hsiao, Industry, CA (US); Richard Lowis Allen Burgard, Fontana, CA (US)

(72) Inventors: Eddie Hsiao, Industry, CA (US); Richard Lowis Allen Burgard, Fontana, CA (US)

( * ) Notice: Subject to any disclaimer, the term of this patent is extended or adjusted under 35 U.S.C. 154(b) by 72 days.

(21) Appl. No.: 14/072,629

(22) Filed: Nov. 5, 2013

(51) Int. Cl.

| | |
|---|---|
| ***B32B 37/00*** | (2006.01) |
| ***B32B 37/06*** | (2006.01) |
| ***B30B 15/02*** | (2006.01) |
| ***B30B 1/04*** | (2006.01) |
| *B41F 16/02* | (2006.01) |

(52) U.S. Cl.
CPC ............. *B32B 37/06* (2013.01); *B32B 37/0053* (2013.01); *B32B 2309/02* (2013.01); *B30B 15/028* (2013.01); *B41F 16/02* (2013.01); *B30B 1/04* (2013.01)

(58) Field of Classification Search
CPC ...... B30B 1/04; B30B 15/028; B30B 15/047; B41F 17/003; B41F 16/00; B41F 16/02
USPC ................. 156/580, 581, 583.1, 583.8, 583.9
See application file for complete search history.

(56) References Cited

U.S. PATENT DOCUMENTS

| | | | | |
|---|---|---|---|---|
| 5,252,171 | A * | 10/1993 | Anderson et al. | 156/358 |
| 5,474,633 | A * | 12/1995 | Myers | 156/230 |
| 6,151,814 | A * | 11/2000 | Raio et al. | 38/30 |
| 7,185,584 | B1 * | 3/2007 | Woods et al. | 100/320 |
| 8,042,588 | B2 * | 10/2011 | Robinson et al. | 156/358 |
| 8,418,739 | B2 * | 4/2013 | Robinson | 156/358 |

* cited by examiner

*Primary Examiner* — James Sells
(74) *Attorney, Agent, or Firm* — Novoclaims Patent Services LLC; Mei Lin Wong

(57) ABSTRACT

A universal heat press machine includes an adjustable supporting frame having, a main body, an actuating handle assembly, and a heat pressing assembly. The heat press assembly includes a first pressing member attaching on the actuating handle assembly, and a second pressing member suspendedly extending from a lower portion of the main body to define an operational space. When the heat pressing assembly is in a heat press position, an imprinting surface of the work piece is arranged to rest on the second pressing member while other parts of the work piece is allowed to temporarily accommodate in the operational space. The first pressing member is pivotally moved to bias against the second pressing member and the imprinting surface of the work piece for imprinting the graphics on the imprinting surface.

20 Claims, 7 Drawing Sheets

UNIVERSAL HEAT PRESS MACHINE

BACKGROUND OF THE PRESENT INVENTION

1. Field of Invention

The present invention relates to a heat press apparatus, and more particularly to a universal heat press machine which is capable of imprinting designs or graphics onto a wide variety of objects.

2. Description of Related Arts

Referring to FIG. 1A and FIG. 1B of the drawings, a conventional heat press machine usually comprises a main body 10P, an upper heating plate 20P movably extending from the main body 10P, a lower supporting plate 30P extending from the main body 10P at a position underneath the upper heating plate 20P, and an actuation handle 40P being provided on top of the upper heating plate 20P. A user is allowed to move the actuation handle 40P so as to pivotally move the upper heating plate 20P to bias against the lower supporting plate 30P. A work piece 80P such as a T-shirt may be put on the lower supporting plate 30P. When the upper heating plate 20P is pivotally moved to bias against the lower supporting plate 30P so that the work piece 80P is sandwiched between the upper heating plate 20P and the lower supporting plate 30P, heat is applied to the work piece 80P and graphics or characters may be imprinted on the work piece 80P through the use of a sublimation paper disposed on the work piece 80P.

There exist a major disadvantage in association with the above-mentioned conventional heat press machine. In order to imprint predetermined graphics or characters on the work piece 80P, it must be horizontally supported on the lower supporting plate 30P, and must be fittedly sandwiched between the lower supporting plate 30P and the upper heating plate 20P. As a result, the work piece 80P must not have significant thickness or it cannot be fittedly sandwiched between the upper heating plate 20P and the lower supporting plate 30P. Hence, conventional heat press machines such as the one disclosed above are only capable of imprinting graphics or characters onto a limited categories of products. For example, conventional heat press machines may be used to imprint graphics on T-shirts, pants, or other clothing. For other products such as backpacks which do not have flat or panel-like structure, conventional heat press machines are not suitable. This is due to the fact that when such a product (e.g. a backpack) is put on the lower supporting plate 30P, the upper heating plate 20P is prevented from fittedly biasing against the lower supporting plate 30P, and the work piece 80P cannot be flatly or horizontally supported on the lower supporting plate 30P. When this happens, the imprinting process of the heat press machine will become infeasible, as shown in FIG. 1B of the drawings.

SUMMARY OF THE PRESENT INVENTION

An objective of the present invention is to provide a universal heat press machine which is capable of imprinting designs or graphics onto a wide variety of objects, such as a backpack.

Another objective of the present invention is to provide a universal heat press machine which defines an operational space underneath a second pressing member for accommodating a work piece having irregular shapes, so that predetermined graphics or characters may be conveniently imprinted on the work piece by the universal heat press machine of the present invention.

Another objective of the present invention is to provide a universal heat press machine comprising an adjustable supporting frame for adjustably varying the size of the operation space defined by the present invention.

Another objective of the present invention is to provide a universal heat press machine comprising a plurality of interchangeable second pressing members having varying sizes for allowing the user to choose the most optimal size of the second pressing member.

In one aspect of the present invention, it provides a universal heat press machine for imprinting predetermined graphics or characters on an imprinting surface of a work piece, comprising:

an adjustable supporting frame;

a main body supported on the adjustable supporting frame;

an actuating handle assembly movably extending from the main body; and a heat pressing assembly, which comprises:

a first pressing member attaching on the actuating handle assembly and defining a lower biasing surface; and a second pressing member suspendedly extending from a lower portion of the main body to define an upper biasing surface and an operational space underneath the second pressing member, wherein the heat pressing assembly is arranged to operate between an idle position and a heat press position, wherein in the idle position, the first pressing member and the second pressing member are pivotally moved away from each other, wherein in the heat press position, the imprinting surface of the work piece is arranged to rest on the upper biasing surface while other parts of the work piece is allowed to temporarily accommodate in the operational space, wherein the first pressing member is pivotally moved to allow the lower biasing surface to bias against the upper biasing surface and the imprinting surface of the work piece for imprinting the graphics or characters on the imprinting surface.

DETAILED DESCRIPTION OF THE PREFERRED EMBODIMENT

Figure 1B:
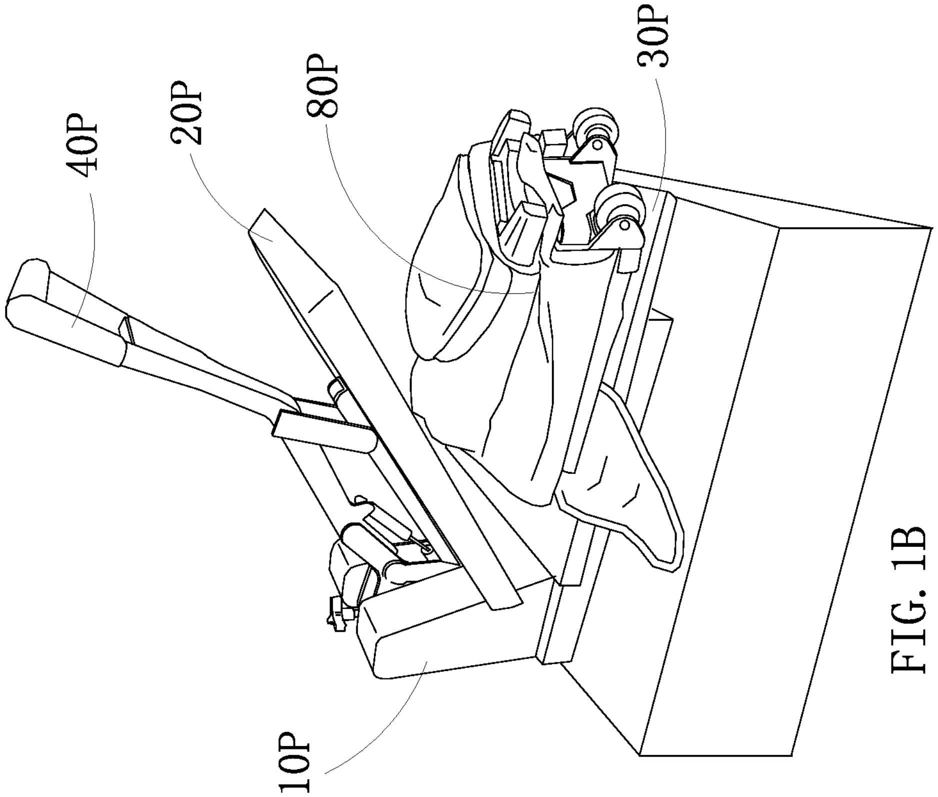
FIG. 1B PRIOR ART
FIG. 1A and FIG. 1B are schematic diagrams of a conventional heat press machine.
Figure 1A:
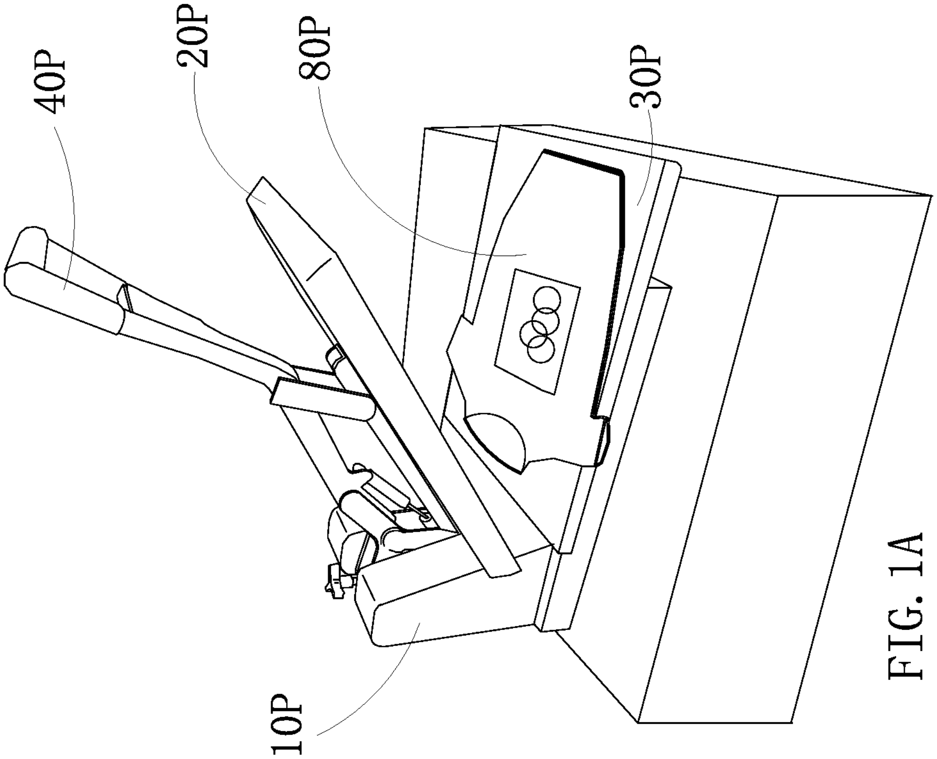
FIG. 1A PRIOR ART
Figure 2:
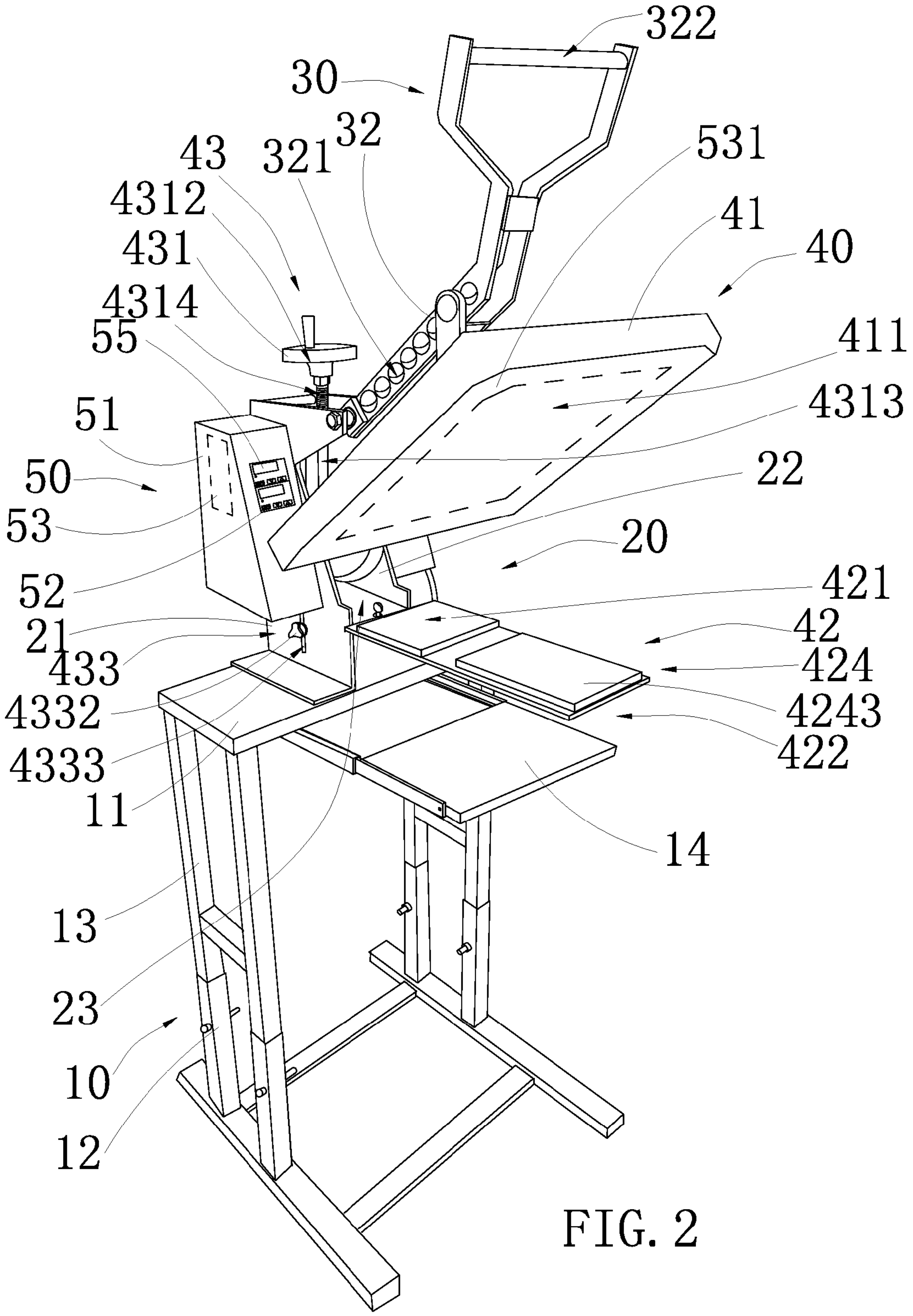
FIG. 2 is a front perspective view of a universal heat press machine according to a preferred embodiment of the present invention.

The following detailed description of the preferred embodiment is the preferred mode of carrying out the invention. The description is not to be taken in any limiting sense. It is presented for the purpose of illustrating the general principles of the present invention.

Referring to FIG. 2 to FIG. 9 of the drawings, a universal heat press machine according to a preferred embodiment of the present invention is illustrated. The universal heat press machine is for imprinting predetermined graphics or characters on an imprinting surface 81 of a work piece 80, such as a backpack. Broadly, the universal heat press machine comprises an adjustable supporting frame 10 comprising a top worktable 11, a main body 20, an actuating handle assembly 30, and a heat pressing assembly 40.

The main body 20 is supported on the worktable 11 of the adjustable supporting frame 10. The actuating handle assembly 30 movably extends from the main body 20 to allow a user to actuate an imprinting process of the heat pressing assembly 40.

The heat pressing assembly 40 comprises a first pressing member 41 and a second pressing member 42. The first pressing member 41 is connected to the actuating handle assembly 30 and defines a lower biasing surface 411.

The second pressing member 42 suspendedly extends from a lower portion of the main body 20 to define an upper biasing surface 421 and an operational space 422 underneath the second pressing member 42. The heat pressing assembly 40 is arranged to operate between an idle position and a heat press position, wherein in the idle position, the first pressing member 41 and the second pressing member 42 are pivotally moved away from each other, wherein in the heat press position, the imprinting surface 81 of the work piece 80 is arranged to rest on the upper biasing surface 421 while other parts of the work piece 80 are allowed to temporarily accommodate in the operational space 422, wherein the first pressing member 41 is pivotally moved to allow the lower biasing surface 411 to bias against the upper biasing surface 421 and the imprinting surface 81 of the work piece 80 for imprinting predetermined graphics or characters on the imprinting surface 81 through the use of a sublimation paper.

According to the preferred embodiment of the present invention, the adjustable supporting frame 10 comprises a lower supporting frame 12 and an upper supporting frame 13 adjustably mounting on the lower supporting frame 12, in such a manner that the upper supporting frame 13 is adapted to move along a longitudinal direction thereof for adjusting a height of the adjustable supporting frame 10. Note that the top worktable 11 is provided on the upper supporting frame 13 so that when it moves along a longitudinal direction thereof, the height of the main body 20 with respect to the ground can also be adjusted.

Figure 8:
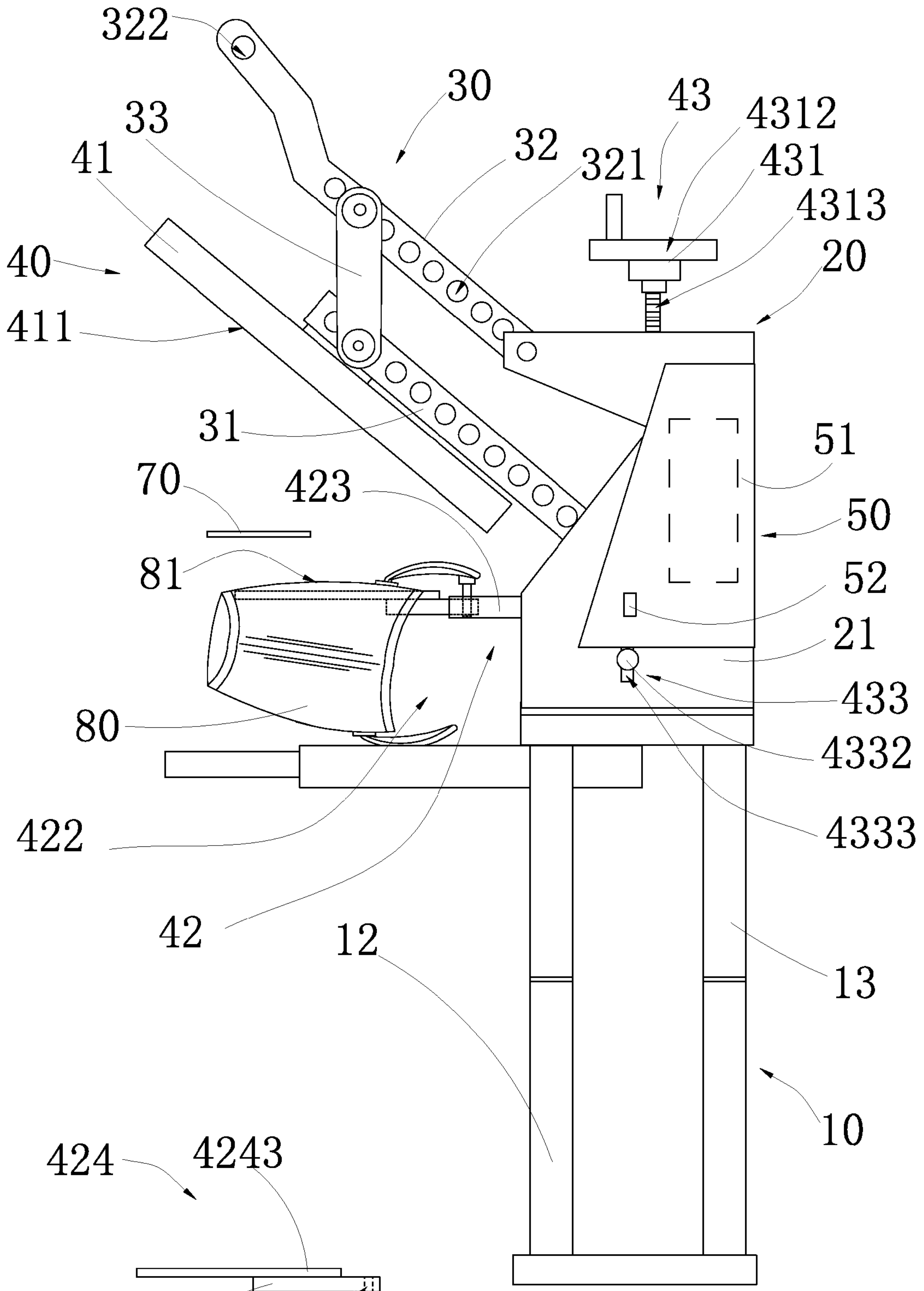
FIG. 8 is side view of the universal heat press machine according to the preferred embodiment of the present invention, illustrating that a work piece is supported by an auxiliary supporting platform of the universal heat press machine.
Figure 9:
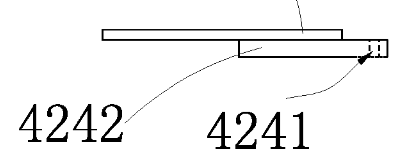
FIG. 9 is side view of the second pressing member of the universal heat press machine according to the preferred embodiment of the present invention.

Furthermore, the adjustable supporting frame 10 further comprises an auxiliary supporting platform 14 mounting on the upper supporting frame 13 in a slidably movable manner at a position below the top worktable 10 in the operational space 422, wherein the user is able to selectively and horizontally extend the auxiliary supporting platform 14 for supporting the work piece 80. When it is not necessary, the user may slide the auxiliary supporting frame 14 towards the adjustable supporting frame 10 and hide it underneath the top worktable 11. The auxiliary supporting platform 14 is necessary when the work piece 80 is too bulky in size. The imprinting surface 81 of the work piece 80 may be supported by the second pressing member 42 while the remaining portions or parts of the work piece 80 may be supported by the auxiliary supporting platform 14, as shown in FIG. 8 of the drawings.

The main body 20 is securely supported on the top worktable 11 of the adjustable supporting frame 10, and comprises a first supporting member 21 and a second supporting member 22 mounted on the top worktable 11 at a position spacedly apart from the first supporting member 21 to define a receiving cavity 23 between an inner side of the first supporting member 21 and an inner side of the second supporting member 22.

The universal heat press machine further comprises a heating device 50 supported by the main body 20 for providing heat to the first pressing member 41 of the heat pressing assembly 40. The heating device 50 comprises a plurality of control housings 51 mounted on outer sides of the first supporting member 21 and the second supporting member 22 respectively, wherein each of the control housings 51 may have a plurality of operational switches 52 and displays 55 for allowing a user to control an operation of the universal heat press machine.

Moreover, the heating device 50 further comprises a heat generation module 53 supported in at least one of the control housings 50 and electrically extends to the first pressing member 41 of the heat pressing assembly 40 for controllably increasing a temperature of the first pressing member 41.

The heat generation module 53 is arranged to increase the temperature of the first pressing member 41 so that when it is pivotally moved to bias against the work piece 80 and the second pressing member 42, predetermined graphics or characters may be imprinted on the work piece 80 through the use of a sublimation paper 70 having a predetermined pattern thereon.

As shown in FIG. 2 to FIG. 5, and FIG. 7 to FIG. 8 of the drawings, the actuating handle assembly 30 extends from the main body 20 for allowing a user to pivotally move the first pressing member 41 towards the second pressing member 42. Specifically, the actuating handle assembly 30 comprises an extension member 31 pivotally extending from the main body 20 to connect to a top side of the first pressing member 41, a handle member 32 pivotally extending from a top portion of the main body 20 at position above the extension member 31, and two connecting members 33 pivotally extending between the extension member 31 and the handle member 32. When the handle member 32 is pivotally and downwardly moved with respect to the main body 10, the extension member 33 is also driven to pivotally and downwardly move by the connecting member 33 so that the first pressing member 41 is also driven to move pivotally and downwardly towards the second pressing member 42.

Figure 4:
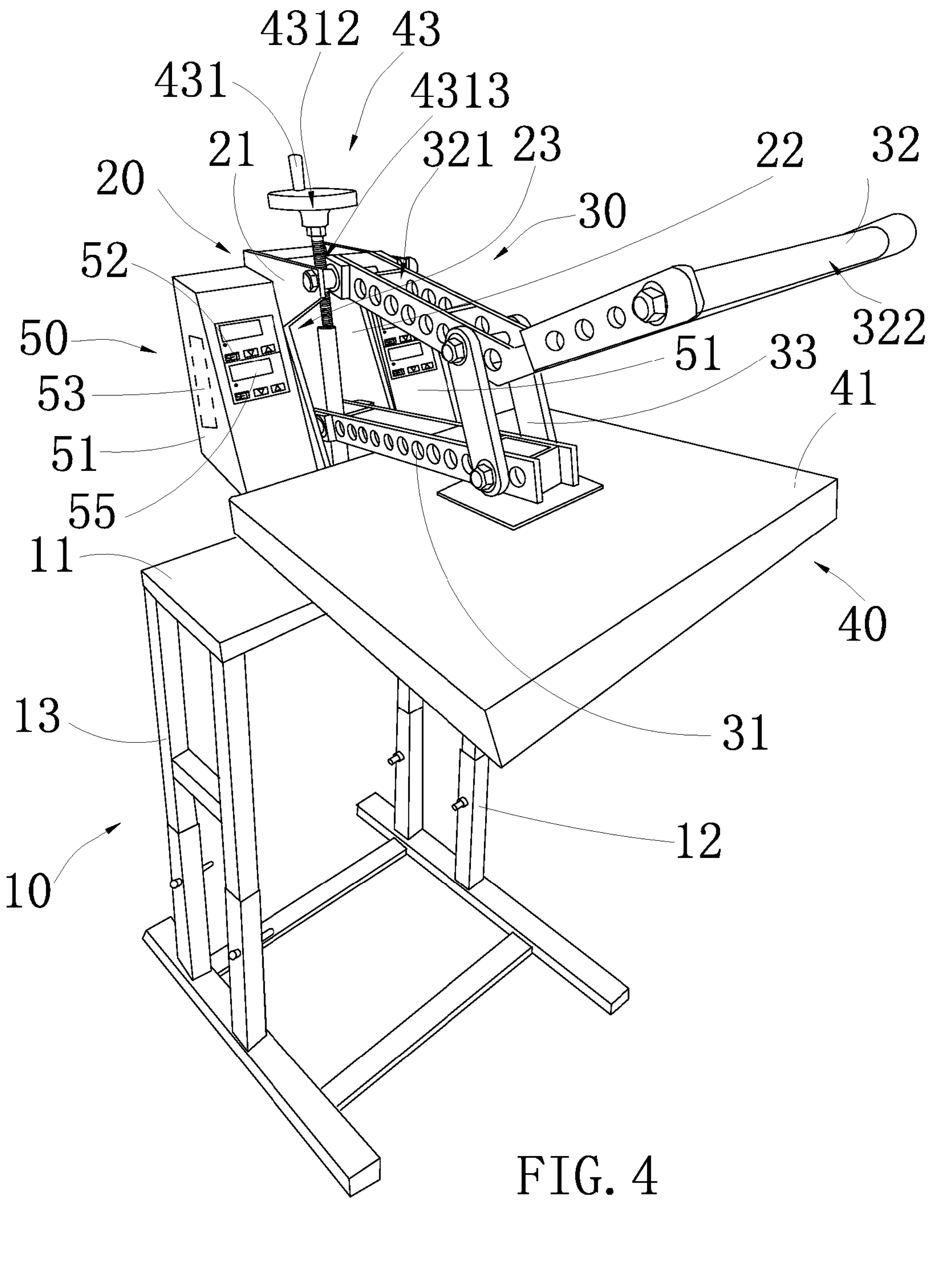
FIG. 4 is another front perspective view of the universal heat press machine according to the preferred embodiment of the present invention.

As shown in FIG. 4 of the drawings, the handle member 32 has a longitudinal portion 321 extending from the main body 10, and a handle portion 322 integrally and inclinedly extending from the longitudinal portion 321, wherein a user is able grab on the handle portion 322 and pivotally move the first pressing member 41 towards the second pressing member 42.

In order to facilitate the pivotal movement of the extension member 33, the actuating handle assembly 30 further comprises a plurality of hydraulics pistons 34 mounting on inner sides of the first supporting member 21 and the second supporting member 22 respectively, wherein the hydraulics pistons 34 are connected to the extension member 33 for pivotally coupling the extension member 33 with the main body 20.

The first pressing member 41 of the heat pressing assembly 40 is configured as a heat plate for providing heat energy to imprint the predetermined graphics or characters onto the work piece 80. Accordingly, the heat generation module 53 may comprise a heating element 531 (schematically shown in FIG. 2 of the drawings) such as a heating wire embedding in first pressing member 41 for providing controlled and adjustable heat energy for the imprinting procedure.

On the other hand, the second pressing member 42 is arranged to be detachably attached on the main body 20. In this preferred embodiment, the second pressing member 42 comprises a mounting track 423 movably extending from the main body 10, and a supporting plate 424 detachably and adjustably mounting on the mounting track 423. Thus, the second pressing member 42 may comprise a plurality of supporting plates 424 each having differing size for being selectively mounted on the mounting track 423. Depending on the size of the work piece 80, a user of the present invention is able to select the most suitable supporting plate 424 and mount it on the mounting track 423 for imprinting the graphics or characters on the work piece 80.

Figure 3:
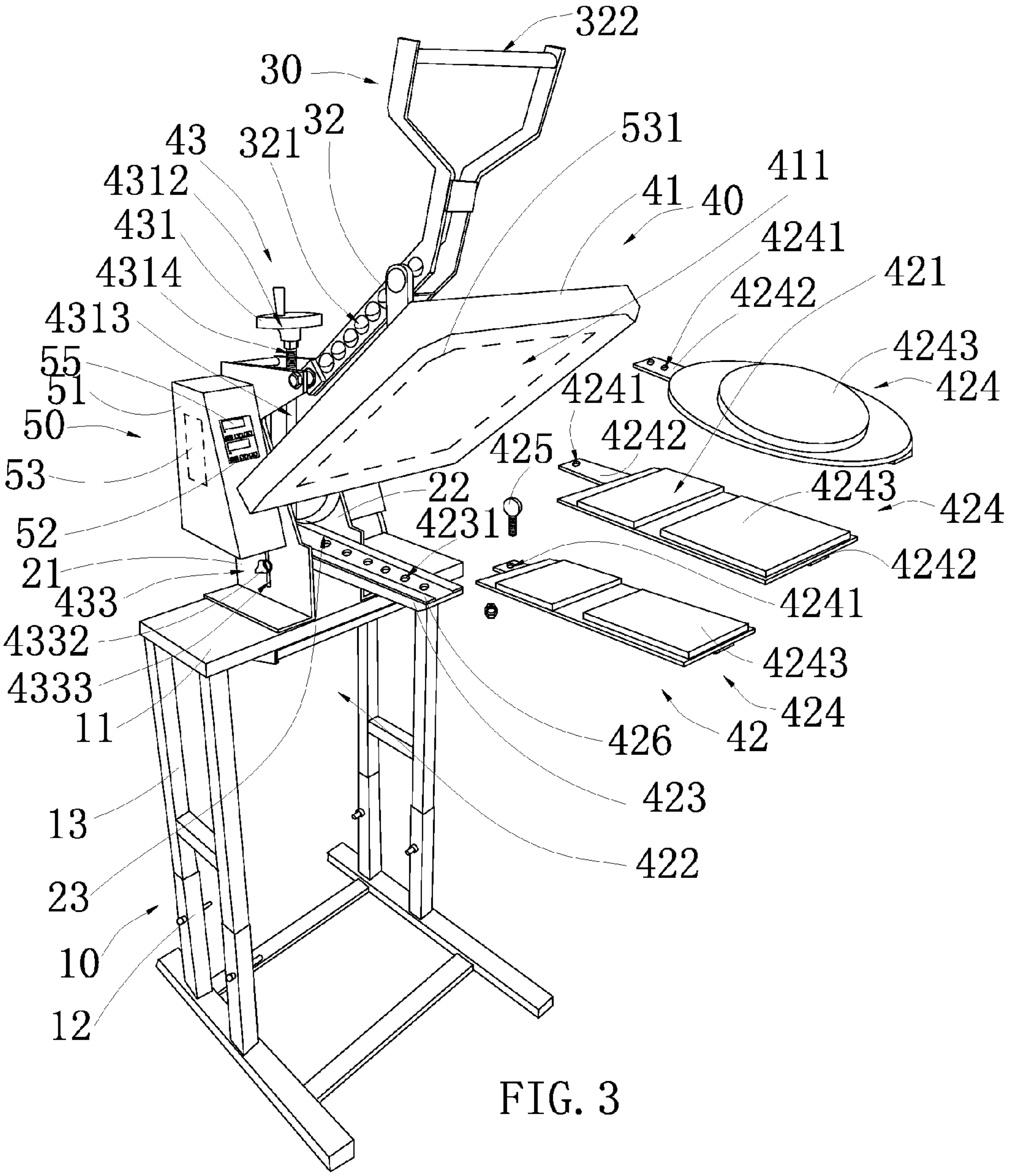
FIG. 3 is a schematic diagram of the universal heat press machine according to the preferred embodiment of the present invention.

Specifically, as shown in FIG. 3 of the drawings, the mounting track 423 has a plurality of mounting holes 4231 spacedly forming thereon, whereas each of the supporting plates 424 has a securing hole 4241 forming thereon. In order to detachably connect the supporting plate 424 to the mounting track 423, the securing hole 4241 is arranged to align with one of the mounting holes 4231. The user of the present invention is then able to penetrate the securing hole 4241 and the corresponding mounting hole 4231 by a fastener 425 for securely fastening the supporting plate 424 on the mounting track 423. Depending on the size of the work piece 80, the user is able to select the most suitable supporting plate 424 and fasten it on the mounting track 423 to form the second pressing member 42 of the heat pressing assembly 40.

Figure 6:
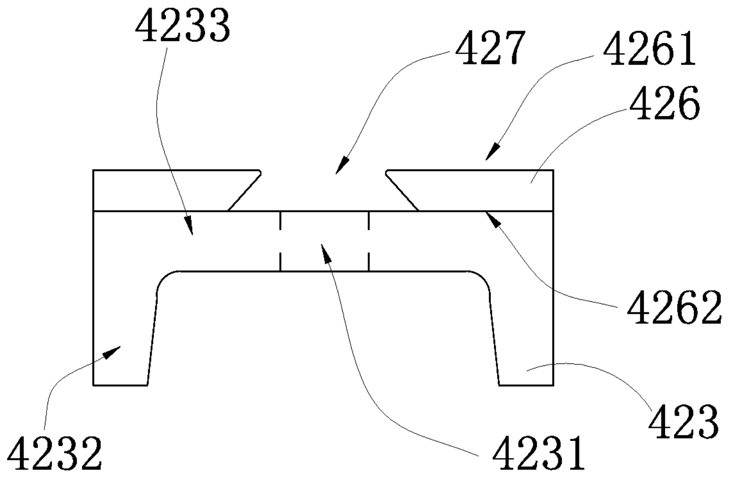
FIG. 6 is a schematic diagram of a second pressing member of the universal heat press machine according to the preferred embodiment of the present invention.
Figure 7:
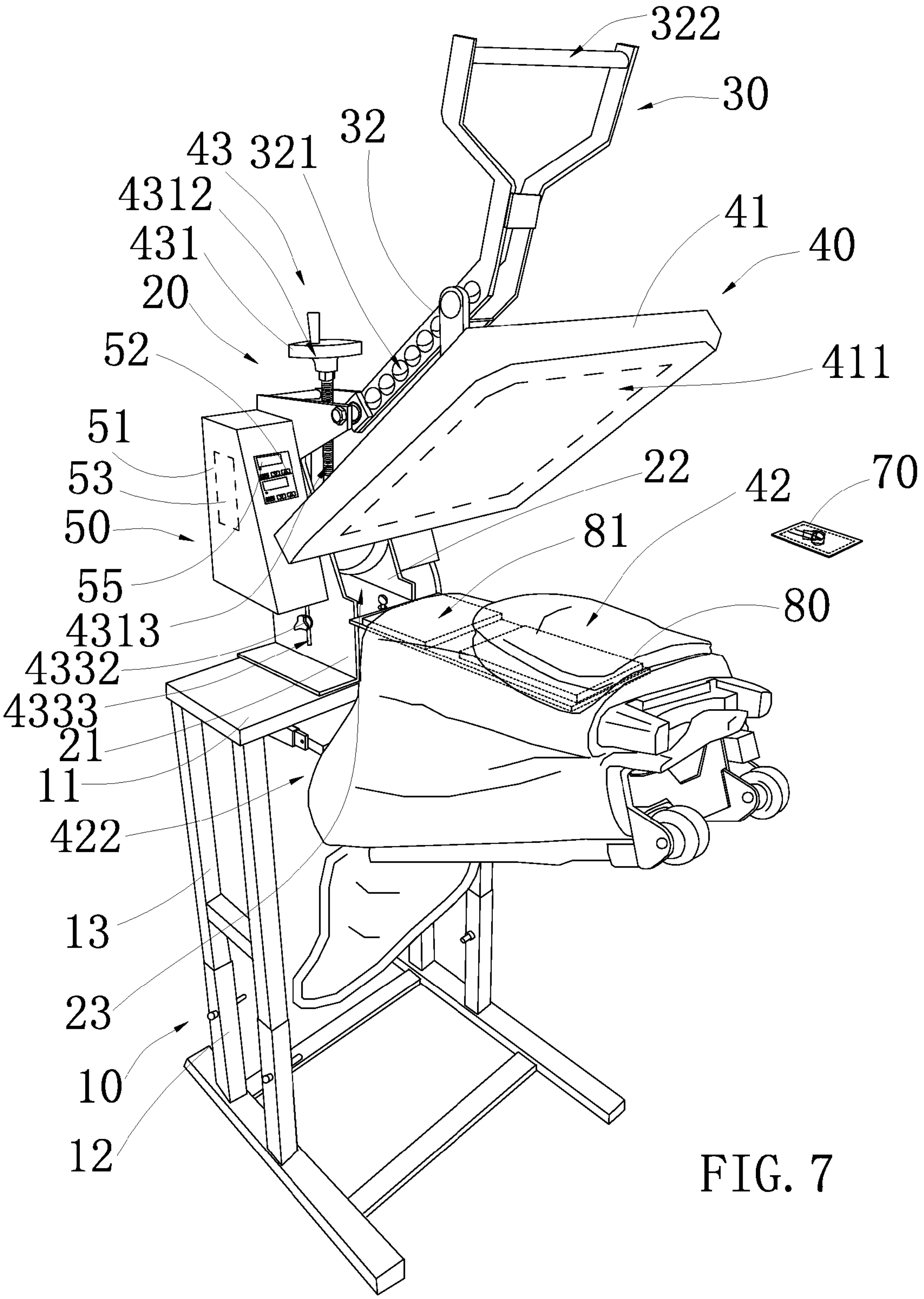
FIG. 7 is a schematic diagram of the universal heat press machine according to the preferred embodiment of the present invention.

Referring to FIG. 6 of the drawings, each of the supporting plates 424 comprises a main plate member 4243 and a coupling member 4242 mounted on a bottom side of the main plate member 4241, wherein the through securing hole 4241 is formed on the coupling member 4242. On the other hand, the second pressing member 42 further comprises a plurality of guiding members 426 mounting on two top side portions of the mounting track 423 respectively to define a guiding channel 427 between the guiding member 426, wherein each of the guiding members 426 has a tapered cross section such that a width of a top side edge 4261 of the guiding member 426 is greater than that of a bottom side edge 4262 of the guiding member 426. The coupling member 4242 of the relevant supporting plate 424 may be inserted into the guiding channel 434 for mounting on the mounting track 423. Thus, a width of the coupling member 4242 is substantially the same as the greatest width of the guiding channel 427 so that the coupling member 4242 can be conveniently inserted into the guiding channel 427.

The position of the mounting track 423 of the second pressing member 42 is adjustable with respect to the main body 20 so as to allow the universal heat press machine to accommodate the maximum types of work pieces 80. More specifically, the heat pressing assembly 40 further comprises a lifting device 43 providing on the main body 20 and coupled to the second pressing member 42 to selectively lift up and move down the mounting track 423 of the second pressing member 42.

The lifting device 43 comprises a lifting actuator 431 having a bottom lifting end portion 4311 connected to the mounting track 423 of the second pressing member 42. When the lifting actuator 431 is actuated, the lifting actuator 431 and the mounting track 423 is driven to move vertically with respect to the main body 20 so as to adjust a height of the second pressing member 42 with respect to the main body 20.

Figure 5:
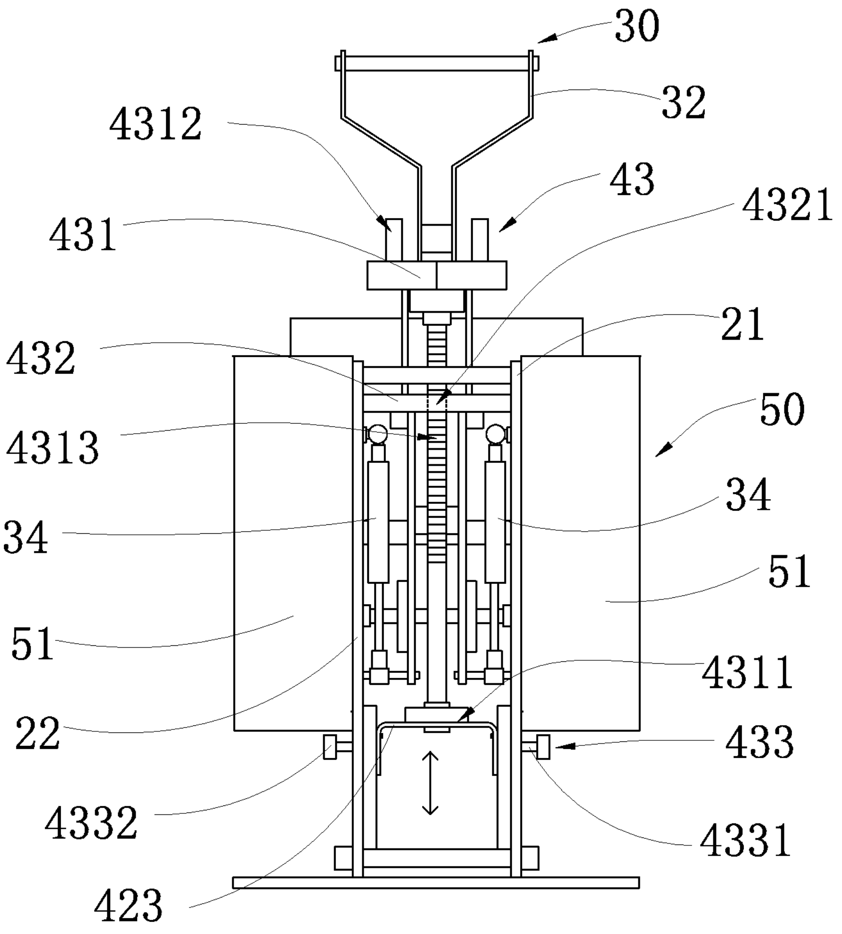
FIG. 5 is a rear perspective view of the universal heat press machine according to the preferred embodiment of the present invention.

Specifically, the lifting actuator 431 further has a top actuating wheel portion 4312, and a rod portion 4313 extending between the top actuating wheel portion 4312 and the bottom lifting end portion 4311. As shown in FIG. 5 of the drawings, the lifting device 43 further comprises a securing member 432 mounted on the main body 20 at a position between the first pressing member 21 and the second pressing member 22, wherein the rod portion 4313 extends between the top actuating wheel portion 4312 and the bottom lifting end portion 4311 through the securing member 432.

The securing member 432 has a bored hole 4321 while the rod portion 4313 has a threaded outer surface 4314. The rod portion 4313 is arranged to penetrate the bored hole 4321 of the securing member 432 in such a manner that the bored hole 4321 engages with the threaded outer surface 4314 of the rod portion 4313. As such, when the top actuating wheel portion 4312 is turned, the rod portion 4313 is also turned. This turning movement allows the rod portion 4313 to move in a longitudinal direction thereof as guided by the engagement between the bored hole 4321 and the threaded outer surface 4314 of the rod portion 4313. The longitudinal movement of the rod portion 4313 drives the bottom lifting end portion 4311 to move upwardly or downwardly with respect to the main body 20 so as to move the second pressing member 42 upwardly or downwardly with respect to the main body 20. As a result, the height of the second pressing member 42 can be adjusted by turning the lifting actuator 431 of the lifting device 43.

As shown in FIG. 6 of the drawings, it is worth mentioning that the mounting track 423 has a plurality of supporting legs 4232 downwardly extending from a top portion 4233 thereof to form a substantially U-shaped cross section of the mounting track 423.

The lifting device 43 further comprises a locking device 433 comprising a plurality of locking pins 4331 extending from two sides of the mounting track 423, a plurality of locking knobs 4332 provided at outer ends of the locking pins 4331 respectively, and containing a plurality of locking slots 4333 forming on the first supporting member 21 and the second supporting member 22 respectively, wherein each of the locking pins 4332 extends from the lifting member 432 to an exterior of the main body 20 through the corresponding locking slot 4333.

Thus, when the second pressing member 42 moves upwardly or downwardly with respect to the main body 20, the locking pins 4331 slides along the corresponding locking slots 4333. The locking knobs 4332 may be turned to bias against the main body 20 for locking up a movement of the second pressing member 42. However, when the locking knobs 4332 are turned to move away from the main body 20, the lifting actuator 431 and the second pressing member 42 are free to move upwardly or downwardly through the actuation of the top actuating wheel portion 4312.

The operation of the present invention is as follows: a user may choose the most suitable supporting plate 424 from a set of supporting plates 424 having different sizes. The user may mount the selected supporting plate 424 to the mounting track 423 by using the fastener 425. When the supporting plate 424 is mounted on the mounting track 423, the user may insert the second pressing member 42 into a cavity of the work piece 80, such as a storage compartment of a backpack, such that the imprinting surface 81 of the work piece 80 is well supported by the second pressing member 42 and is held facing upward towards the first pressing member 41. It is important to mention that with this design of the universal heat press machine of the present invention, the remaining portion of the work piece 80 may be suspendedly supported in the operational space 422. In order to better support the work piece 80, the auxiliary supporting platform 14 may slidably extend from underneath the top worktable 11 of the adjustable supporting frame 10 to provide better support to the work piece 80, as shown in FIG. 8 of the drawings.

The user may then adjust the height of the second pressing member 42 as mentioned above. When the second pressing member 42 is properly positioned, a sublimation paper 70 is disposed on top of the imprinting surface 81 of the work piece 80. The user may then operate the heating device 50 and allow the first pressing member 41 to be heated up to a predetermined temperature. After that, the user may grab the actuating handle assembly 30 and pivotally move it to bias against the second pressing member 42. The imprinting surface 81 of the work piece 80 and the sublimation paper 70 are sandwiched between the first pressing member 41 and the second pressing member 42. After a predetermined period of time (usually few seconds), the user may then move the first pressing member 41 back to its original position. A predetermined graphics or characters are now imprinted on the imprinting surface 81 of the work piece 80.

The advantage of the universal heat press machine of the present invention is that by allowing the user to select the optimal supporting plate 424 and providing the operational space 422 underneath the second pressing member 42, the user is able to imprint predetermined graphics or characters onto a wide variety of work pieces 80. As long as the imprinting surface 81 of the work piece 80 may be fitted onto the second pressing member 42, the shape or contour of the remaining portions of the work piece 80 is immaterial, because it can easily be accommodated in the operational space 422 and may also be supported by the auxiliary supporting platform 14.

The present invention, while illustrated and described in terms of a preferred embodiment and several alternatives, is not limited to the particular description contained in this specification. Additional alternative or equivalent components could also be used to practice the present invention.

What is claimed is:

1. A universal heat press machine for imprinting a graphics on an imprinting surface of a work piece, comprising:

- an adjustable supporting frame which comprises a top worktable;
- a main body supported on said worktable of said adjustable supporting frame;
- an actuating handle assembly movably extending from said main body;
- a heat pressing assembly, which comprises:
- a first pressing member attaching on said actuating handle assembly and defining a lower biasing surface; and
- a second pressing member suspendedly extending from a lower portion of said main body to define an upper biasing surface and an operational space underneath said second pressing member, wherein said heat pressing assembly is arranged to operate between an idle position and a heat press position, wherein in said idle position, said first pressing member and said second pressing member are pivotally moved away from each other, wherein in said heat press position, said imprinting surface of said work piece is arranged to rest on said upper biasing surface while other parts of said work piece is allowed to temporarily accommodate in said operational space, wherein said first pressing member is pivotally moved to allow said lower biasing surface to bias against said upper biasing surface and said imprinting surface of said work piece for imprinting said graphics on said imprinting surface; and
- a heating device being supported by said main body for providing heat to said first pressing member of said heat pressing assembly.

2. The universal heat press machine, as recited in claim 1, wherein said second pressing member comprises a mounting track movably extending from said main body, and a supporting plate detachably and adjustably mounting on said mounting track.

3. The universal heat press machine, as recited in claim 2, wherein said mounting track has a plurality of mounting holes spacedly forming thereon, and said supporting plate has a securing hole forming thereon, wherein said supporting plate and said mounting track are detachably attached together through one of said mounting holes and said securing hole.

4. The universal heat press machine, as recited in claim 3, wherein said supporting plate comprises a main plate member and a coupling member mounted on a bottom side of said main plate member, wherein said through securing hole is formed on said coupling member, said second pressing member further comprising a plurality of guiding members mounting on two side portions of said mounting track respectively to define a guiding channel between said guiding members for receiving said coupling member.

5. The universal heat press machine, as recited in claim 4, wherein each of said guiding members has a tapered cross section, such that a width of a top side edge of said guiding member is greater than that of a bottom side edge thereof, wherein a width of said coupling member is substantially the same as a greatest width of said guiding channel.

6. The universal heat press machine, as recited in claim 1, wherein said heat pressing assembly further comprises a lifting device providing on said main body and coupled to said second pressing member to selectively lift up and move down said second pressing member.

7. The universal heat press machine, as recited in claim 5, wherein said heat pressing assembly further comprises a lifting device providing on said main body and coupled to said second pressing member to selectively lift up and move down said second pressing member.

8. The universal heat press machine, as recited in claim 6, wherein said lifting device comprises a lifting actuator which has a bottom lifting end portion connecting to said second pressing member, a top actuating wheel portion, and a rod portion extending between said top actuating wheel portion and said bottom lifting end portion, wherein said lifting device further comprises a securing member mounted on said main body at a position between said first pressing member and said second pressing member, wherein said rod portion movably extends between said top actuating wheel portion and said bottom lifting end portion through said securing member.

9. The universal heat press machine, as recited in claim 7, wherein said lifting device comprises a lifting actuator which has a bottom lifting end portion connecting to said mounting track of said second pressing member, a top actuating wheel portion, and a rod portion extending between said top actuating wheel portion and said bottom lifting end portion, wherein said lifting device further comprises a securing member mounted on said main body at a position between said first pressing member and said second pressing member, wherein said rod portion movably extends between said top actuating wheel portion and said bottom lifting end portion through said securing member.

10. The universal heat press machine, as recited in claim 8, wherein said securing member has a bored hole while said rod portion has a threaded outer surface, wherein said rod portion is arranged to penetrate said bored hole of said securing member in such a manner that said bored hole engages with said threaded outer surface of said rod portion.

11. The universal heat press machine, as recited in claim 9, wherein said securing member has a bored hole while said rod portion has a threaded outer surface, wherein said rod portion is arranged to penetrate said bored hole of said securing member in such a manner that said bored hole engages with said threaded outer surface of said rod portion.

12. The universal heat press machine, as recited in claim 1, wherein said adjustable supporting frame comprises a lower supporting frame and an upper supporting frame adjustably mounting on said lower supporting frame, in such a manner that said upper supporting frame is adapted to move along a longitudinal direction thereof for adjusting a height of said adjustable supporting frame.

13. The universal heat press machine, as recited in claim 11, wherein said adjustable supporting frame comprises a lower supporting frame and an upper supporting frame adjustably mounting on said lower supporting frame, in such a manner that said upper supporting frame is adapted to move along a longitudinal direction thereof for adjusting a height of said adjustable supporting frame.

14. The universal heat press machine, as recited in claim 12, wherein said adjustable supporting frame further comprises an auxiliary supporting platform being mounted on said upper supporting frame at a position below said top worktable and in a slidably movable manner, so that said auxiliary supporting platform is adapted to horizontally and selectively extend from said upper supporting frame.

15. The universal heat press machine, as recited in claim 13, wherein said adjustable supporting frame further comprises an auxiliary supporting platform being mounted on said upper supporting frame at a position below said top worktable and in a slidably movable manner, so that said auxiliary supporting platform is adapted to horizontally and selectively extend from said upper supporting frame.

16. The universal heat press machine, as recited in claim 1, wherein said main body is securely supported on said top worktable of said adjustable supporting frame, and comprises a first supporting member and a second supporting member spacedly providing on said top worktable to define a receiving cavity between an inner side of said first supporting member and an inner side of said second supporting member.

17. The universal heat press machine, as recited in claim 15, wherein said main body is securely supported on said top worktable of said adjustable supporting frame, and comprises a first supporting member and a second supporting member spacedly providing on said top worktable to define a receiving cavity between an inner side of said first supporting member and an inner side of said second supporting member.

18. The universal heat press machine, as recited in claim 17, wherein said lifting device further comprises a locking device comprising a plurality of locking pins extending from two sides of said second pressing member, a plurality of locking knobs provided at outer ends of said locking pins respectively, wherein said locking device further contains a plurality of locking slots forming on said first supporting member and said second supporting member respectively, wherein each of said locking pins extends from said lifting member to an exterior of said main body to connect to said corresponding locking knob through said corresponding locking slot.

19. The universal heat press machine, as recited in claim 1, wherein said actuating handle assembly comprises an extension member pivotally extending from said main body to connect to a top side of said first pressing member, a handle member pivotally extending from a top portion of said main body at position above said extension member, and a connecting member pivotally extending between said extension member and said handle member.

20. The universal heat press machine, as recited in claim 18, wherein said actuating handle assembly comprises an extension member pivotally extending from said main body to connect to a top side of said first pressing member, a handle member pivotally extending from a top portion of said main body at position above said extension member, and a connecting member pivotally extending between said extension member and said handle member.

* * * * *